United States Patent [19]

Ujihara et al.

[11] Patent Number: 4,669,222
[45] Date of Patent: Jun. 2, 1987

[54] WINDOW REGULATOR

[75] Inventors: Hiroshi Ujihara; Hirotaka Nishijima, both of Yokohama; Satoru Ugawa, Hadano; Tomotaka Kinoshita, Yokohama; Satoshi Obushi, deceased, late of Fukuoka, all of Japan, by Fukashi Obuchi, Ruriko Obuchi, legal representatives

[73] Assignees: Nissan Motor Co., Ltd.; Ohi Seisakusho Co., Ltd., both of Yokohama, Japan

[21] Appl. No.: 799,870

[22] Filed: Nov. 21, 1985

[30] Foreign Application Priority Data

Nov. 24, 1984 [JP] Japan .................................. 59-248491
Oct. 16, 1985 [JP] Japan .................................. 60-228919

[51] Int. Cl.⁴ ............................................. E05F 11/38
[52] U.S. Cl. ........................................ 49/374; 49/349; 49/352; 49/360
[58] Field of Search ................. 49/374, 375, 348, 349, 49/350, 351, 352, 360

[56] References Cited

U.S. PATENT DOCUMENTS

| 1,928,056 | 9/1933 | Holt et al. ............................... 49/375 |
| 2,000,561 | 5/1935 | Haberstump ...................... 49/375 X |
| 2,379,925 | 7/1945 | Roethel ................................... 49/375 |
| 3,125,334 | 3/1964 | Lohr ................................. 49/349 X |
| 3,640,022 | 2/1972 | Kouth et al. ...................... 49/348 X |

FOREIGN PATENT DOCUMENTS 50-20327  7/1975  Japan .

Primary Examiner—Philip C. Kannan
Attorney, Agent, or Firm—Schwartz, Jeffery, Schwaab, Mack, Blumenthal & Evans

[57] ABSTRACT

A roller unit of a window regulator is movably engaged with a guide rail of a U-shaped cross section. The guide rail has a pair of parallel side walls one of which is formed with a longitudinal groove of a V-shaped cross section and the other is formed to be planar. The roller unit includes a pair of convexly surfaced rollers in rolling contact with the grooved side wall and a flat surfaced roller in rolling contact with the planar side wall. The flat surfaced roller is movable toward and away from the planar side wall and urged against the same by a spring.

12 Claims, 13 Drawing Figures

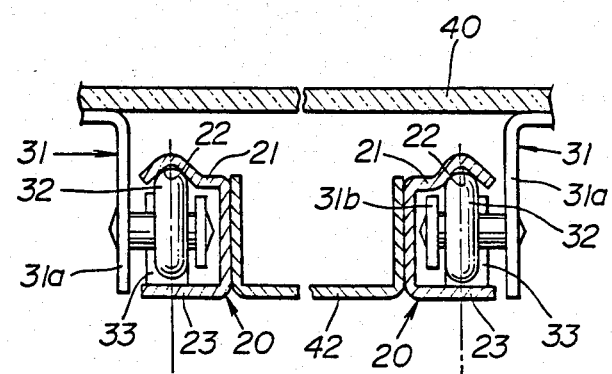
FIG. 1A
FIG. 1B
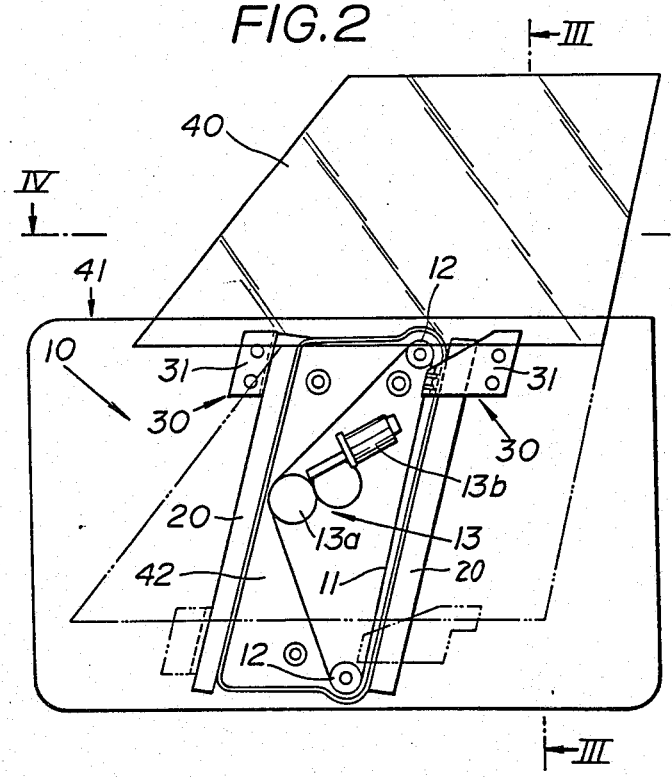
FIG. 2
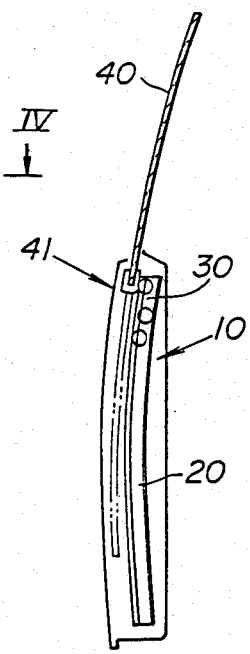
FIG. 3

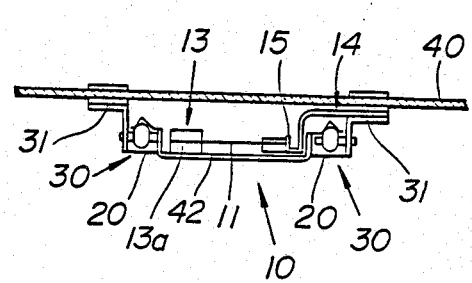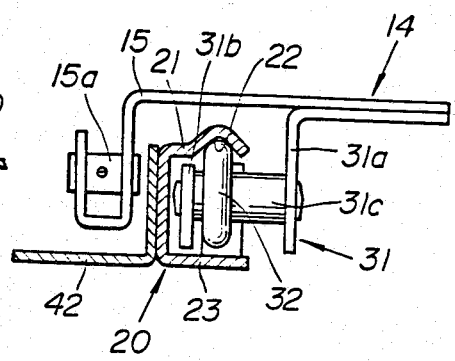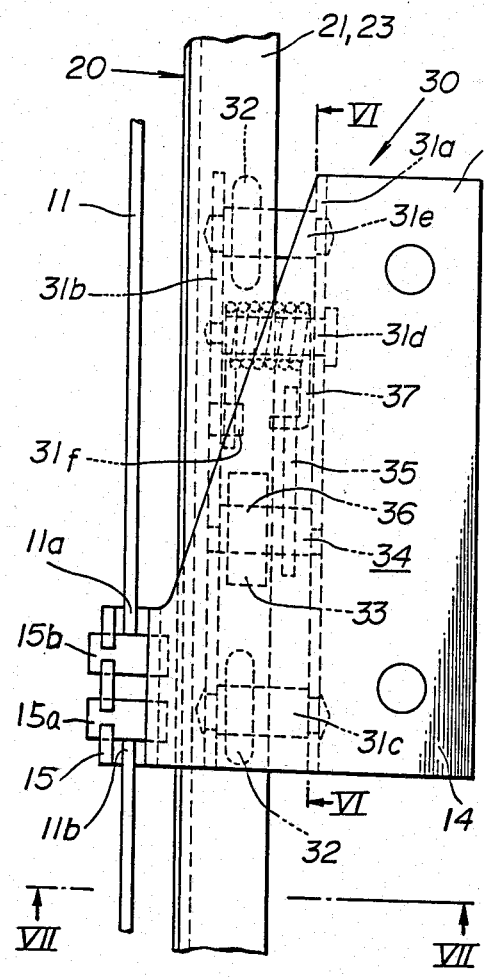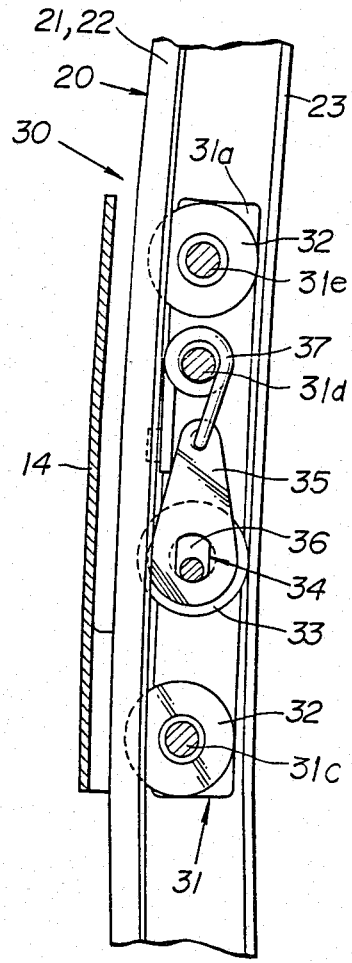

WINDOW REGULATOR

BACKGROUND OF THE INVENTION

1. Field of the Invention

The present invention relates in general to automotive vehicle doors and more particularly to a window regulator for raising and lowering a door glass or window pane which is guided by guide rails and guide rollers.

2. Description of the Prior Art

A prior art window regulator, as disclosed in the Japanese Patent Publication No. 50-20327, includes a guide bracket which has an end secured to a window pane and the other end received in a guide rail of a U-shaped cross section. The guide rail has parallel side walls which are respectively formed with grooves of a V-shaped cross section, while the other end of the guide bracket is formed with grooves which are respectively matched with the grooves of the guide rail. A pair of guide rollers are disposed in the matched grooves of the guide rail and the guide bracket so as to guide the bracket slidably on the guide rail.

A disadvantage of the above described prior art window regulator is that a clearance cannot be provided between the grooves and the guide rollers since leading to play of the window pane. Further, if the matched grooves of the guide rail and the guide bracket are not aligned with each other or with the guide rollers, the guide rollers and therefore the window pane cannot slide smoothly. For this reason, not only the parts of the window regulator need to be precision but delicate adjustment upon assembly is required in order to accurately align the rooves and rollers with each other, resulting in an increased manufacturing and assembling cost.

SUMMARY OF THE INVENTION

In accordance with the present invention, there is provided a novel and improved window regulator for an automotive vehicle door. The window regulator comprises a pair of stationary guide rails and a pair of roller units movably engaged with the guide rails. Each of the guide rails is U-shaped in cross section and has first and second parallel side walls. The first side wall is formed with a longitudinal groove of a V-shaped cross section and the second side wall is planar. Each of the roller units includes a first roller in rolling contact with the first side wall and a second roller in rolling contact with the second side wall.

The above structure is quite effective for overcoming the above noted disadvantages and shortcomings inherent in the prior art device.

It is accordingly an object of the present invention to provide a novel and improved window regulator for an automotive vehicle door which can effect smooth movement of a window pane without requiring a delicate and difficult adjusting work as well as precision constitutent parts.

It is another object of the present invention to provide a novel and improved window regulator of the above described character which can reduce the manufacturing and assembling expense.

It is a further object of the present invention to provide a novel and improved window regulator of the above described character which can compensate production tolerances which are inevitable in the manufacture of the constituent parts.

It is a yet further object of the present invention to provide a novel and improved window regulator of the above described character which is assuredly prevented from play of the window pane.

It is a still further object of the present invention to provide a novel and improved window regulator of the above described character which is increased in durability and can effect smooth movement of the window pane for an increased period of time.

BRIEF DESCRIPTION OF THE DRAWINGS

The features and advantages of the window regulator according to the present invention will become more clearly appreciated from the following description taken in conjunction with the accompanying drawings, in which:

FIG. 1A is a fragmentary sectional view of a novel important portion of a window regulator according to an embodiment of the present invention, in an installed state in which rollers are aligned with grooves;

FIG. 1B is a view similar to FIG. 1A but showing the same in another installed state in which a roller is misaligned with a groove;

FIG. 2 is an elevational view of the window regulator of FIGS. 1A and 1B;

FIG. 3 is a sectional view taken along the line III—III of FIG. 2;

FIG. 4 is a sectional view taken along the line IV—IV of FIG. 2;

FIG. 5 is an enlarged elevational view of the novel important portion of FIGS. 1A and 1B;

FIG. 6 is a sectional view taken along the line VI—VI of FIG. 5;

FIG. 7 is a sectional view taken along the line VII—VII of FIG. 5;

DETAILED DESICRIPTION OF THE PREFERRED EMBODIMDENTS

Figure 8:
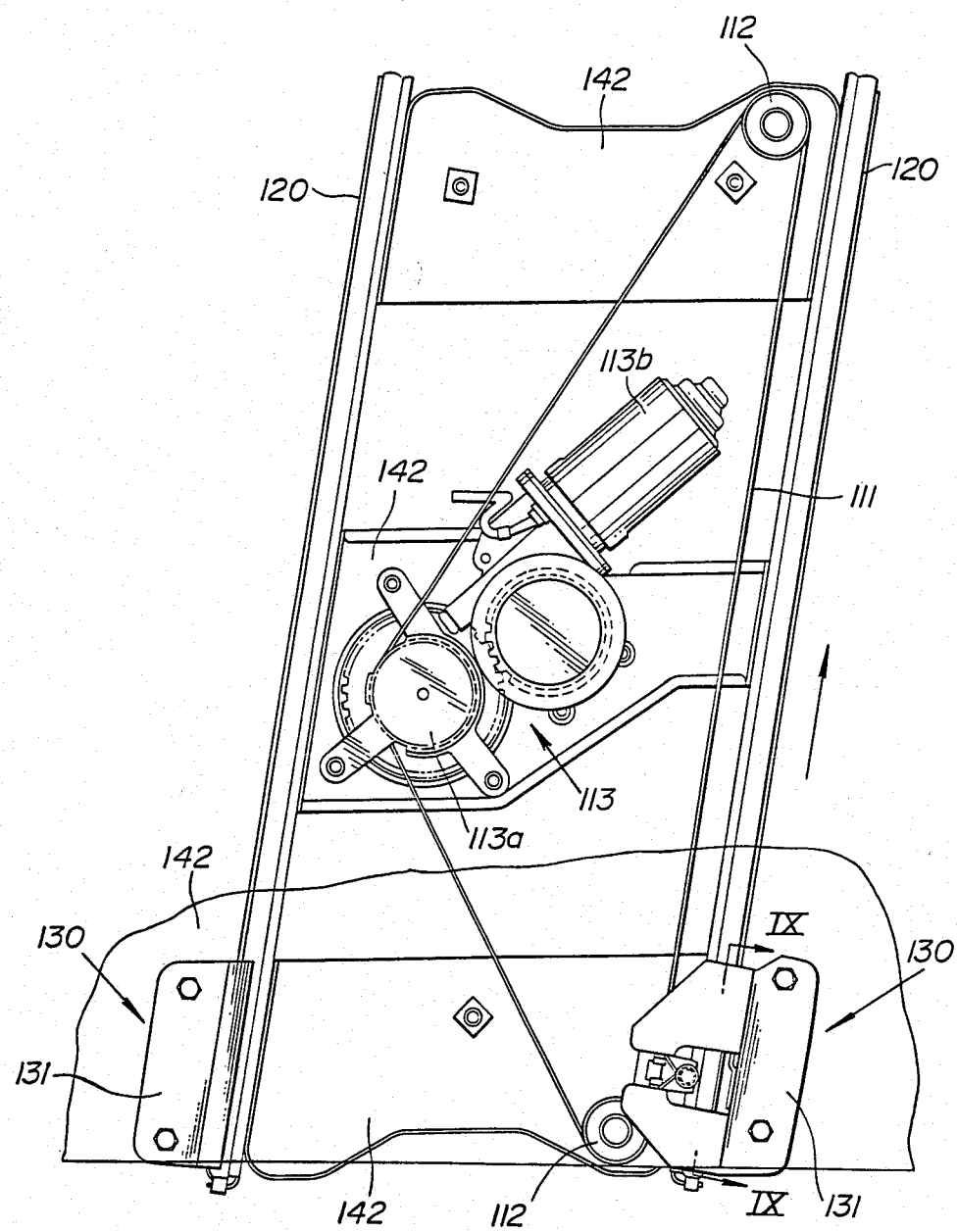
FIG. 8 is an elevational view of a window regulator according to another embodiment of the present invention.

Referring first to FIGS. 1 through 7, a window regulator is generally indicated by the reference numeral 10 and used for raising and lowering a door glass or window pane 40 of an automotive vehicle door 41.

The window regulator 10 includes a pair of guide rails 20, 20 disposed nearly vertically or disposed to elongate in the directions of movement of the window pane 40 and joined together by means of a beam or connecting plate 42 which is secured to the door 41. The window regulator 10 further includes a cable 11 having a portion extending alongside one of the guide rails 20, 20 and placed around a pair of guide pulleys 12, 12 and a winding drum 13a of a drive unit 13. The drive unit 13 consists of the winding drum 13a and a drive motor 13b.

As seen from FIG. 1, the guide rails 20, 20 are U-shaped in cross section and includes a pair of side walls 21, 23, one 21 of which is formed with a longitudinal groove 22 of a V-shaped cross section and the other 23 is formed to be flat or planar.

A pair of roller units 30, 30 are engaged with the guide rails 20, 20, respectively. As seen from FIGS. 5 through 7, each roller unit 30 consists of a carrier plate assembly 31 secured to the window pane 40 and having a pair of elongated support brackets 31a, 31b parallel to the guide rails 20, 20, a pair of convexly surfaced guide rollers 32, 32 having a convex outer circumferential periphery and rotatably supported on the support brackets 31a, 31b at the locations adjacent the upper and lower ends thereof, and a flat surfaced roller 33 having a flat outer circumferential periphery and rotatably supported on the support brackets 31a, 31b at the location between the convexly surfaced rollers 32, 32. More specifically, as best seen from FIG. 7, the support bracket 31a is L-shaped in cross section, while the support bracket 31b is in the form of a flat or planar elongated plate. The support brackets 31a and 31b are integrally connected to each other by a pair of shafts 31c, 31d which extend therebetween and secured to same at the opposite ends thereof. The lower convexly surfaced roller 32 is rotatably mounted on the shaft 31c, while the upper convexly surfaced roller 32 is rotatably mounted on a shaft 31e which extends between the support brackets 31a, 31b and mounted on same at the opposite ends thereof.

The convexly surfaced roller 32 is engaged in or in rolling contact with the V-shaped groove 22 of the side wall 21, while the flat surfaced roller 33 is in rolling contact with the side wall 23. The flat surfaced roller 33 is rotatably mounted on an eccentric portion 36 of a shaft 34 which is in turn rotatably mounted at the opposite ends thereof on the support brackets 31a, 31b of the carrier plate assembly 31. A pivotal lever 35 is mounted at an end thereof on the eccentric portion 36 of the shaft 34 to rotate together therewith and connected at the other end thereof to an end of a coil spring 37 placed around the shaft 31d. The other end of the coil spring 37 is abuttingly engaged with a stopper 31f integrally provided to the support bracket 31b in such a manner as to be preloaded to urge the pivotal lever 35 in the clockwise direction in FIG. 6, i.e., to urge the flat surfaced roller 33 toward the flat surfaced side wall 23 of the guide rail 20.

As seen from FIG. 2, one of the roller units 30, 30 is located more forward of the vehicle than the other, and the window pane 40 is mounted at the forward and rearward lower end portions thereof on the support brackets 31a, 31a of the forward and rearward roller units 30, 30, respectively.

To the support bracket 31a of the rearward roller unit 30, a connecting plate 14 is integrally connected as best seen from FIG. 7. The connecting plate 14 has a connecting end 15 extended toward the cable 11 to connect thereto the opposite ends 11a, 11b of the cable 11 by a suitable fastening means such as trunnion pins 15a, 15b.

In operation, when the drive motor 13b of the drive unit 13 is actuated to rotate the winding drum 13a in one or the other direction, the aforementioned portion of the cable 11 alongside one guide rail 20 is caused to axially move upwardly or downwardly. The connecting plate 14 is thus caused to move upwardly or downwardly, whereby to move the window pane 40 upwardly or downwardly to close or open the window of the door 41.

Upon the upward and downward movements of the window pane 40, the roller units 30, 30 are caused to move upwardly and downwardly being guided by the guide rails 20, 20. In this connection, since the flat surfaced rollers 33, 33 are urged against the side walls 23, 23 under the bias of the springs 37, 37, the convexly surfaced rollers 32, 32 are urged away from the flat surfaced rollers 33, 33 to fittingly engage in the grooves 22, 22.

In the above, it is to be noted that the pivotal lever 35 is mounted on the eccentric portion 36 of the shaft 34 to rotate together therewith and constructed and arranged so that the bias of the spring 37 to be applied to the flat surfaced roller 33 is amplified by the effect of leverage, thus making it possible to efficiently transmit the bias of the spring 37 to the flat surfaced roller 33. Accordingly, with the small-sized spring 37, the roller units 30, 30 are assuredly engaged with the guide rails 20, 20 without any play therebetween even if the grooves 22, 22 of the side walls 21, 21 have any dimensional errors in the direction transversal to the side walls 23, 23.

It is further to be noted that the groove 22 is formed in one side wall 21 only and the other side wall 23 is formed to be planar, whereby all of the rollers 32, 33 can fittingly engage the side walls 21, 23 without any play therebetween even if the groove 22 has any dimensional errors in the direction parallel to the side wall 23.

FIG. 1A shows the roller units 30, 30 and the guide rails 20, 20 in an installed or assembled state in which the convexly surfaced rollers 32, 32 are aligned with the grooves 22, 22, i.e., correctly received in the grooves 22, 22. In contrast to this, FIG. 1B shows another installed or assembled state in which one convexly surfaced roller 32 is misaligned with the groove 22, i.e., incorrectly received in the groove 22. When the roller 32 is misaligned with the groove 22 as shown in FIG. 1B, the rollers 32, 33 are allowed to go nearer to each other by the resilience of the spring 37, thus preventing the rollers 32, 33 from sticking to the guide rails 20, 20.

Figure 10:
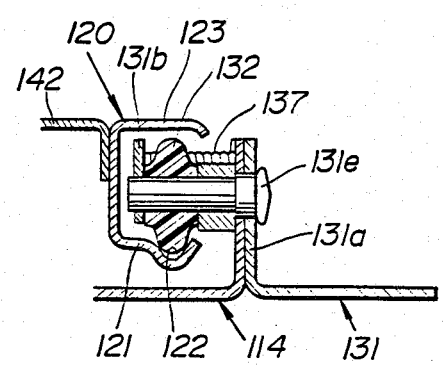
FIG. 10 is a sectional view taken along the line X—X of FIG. 9.
Figure 11:
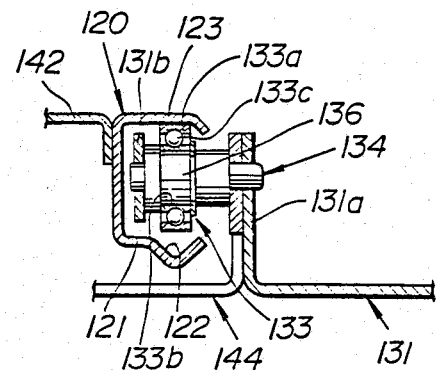
FIG. 11 is a sectional view taken along the line XI—XI of FIG. 9.
Figure 9:
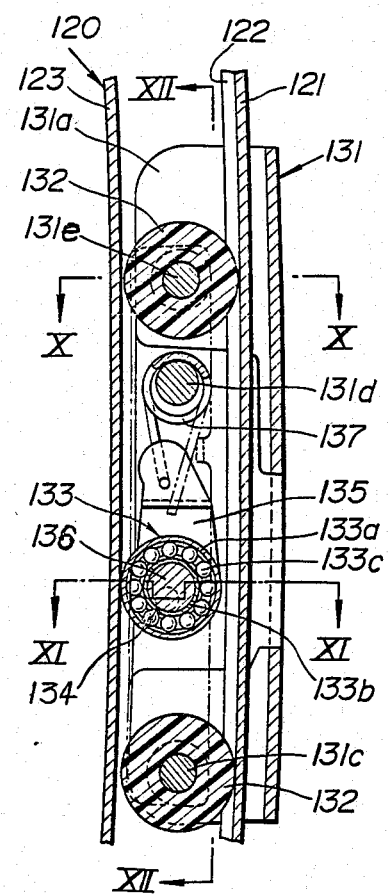
FIG. 9 is a sectional view taken along the line IX—IX of FIG. 8.
Figure 12:
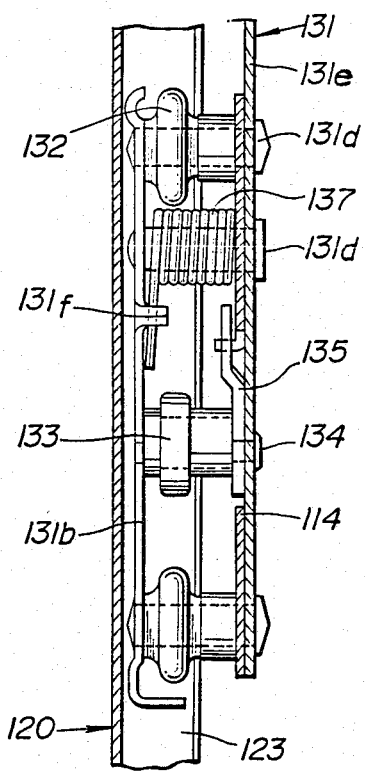
FIG. 12 is a sectional view taken along the line XII—XII of FIG. 9.

Another embodiment is shown in FIGS. 8 through 12, in which elements like or corresponding to those in the previous embodiment are denoted by adding 100 to their identifying numerals. This embodiment features that the flat surfaced roller 133 is made of metal such as iron, steel, etc. while the convexly surfaced rollers 132, 132 are made of a hard synthetic resinous material having a predetermined resiliency such as acetal resins. More specifically, the roller 133 made of metal is formed from a ball bearing consisting of an outer ring 133a, an inner ring 133b mounted on the eccentric portion 136 of the shaft 134, and a plurality of balls 133c confined between the outer and inner rings 133a, 133b. The outer ring 133a is in rolling contact with the side wall 123 under the bias of the spring 137. The rollers 132, 132 made of a synthetic resinous material is engaged in or in rolling contact with the grooves 122, 122 formed in the side walls 121, 121. Except for the above structure, this embodiment is substantially similar to the previous embodiment.

In the above, it is to be noted that the flat surfaced roller 133 is made of metal while the convexly surfaced rollers 132, 132 are made of a synthetic resinous material. This is quite effective for reducing the resistance to movement of the roller unit 130 on the guide rail 120, whereby to make it possible for the window pane 140 to move more smoothly.

It is further to be noted that the rollers 132, 132 made of a synthetic resinous material are engaged with one side wall 121 of the guide rail 120 while the roller 133 made of metal is engaged with the other side wall 123.

This is quite effective for attaining smooth movement of the window pane 140 for a long period of time since the roller 133 made of metal is assuredly and durably engaged with the guide rail 120 while the rollers 132, 132 made of a synthetic resinous material make soft and smooth the abutting engagement of the roller 133 with the guide rail 120.

The embodiment of FIGS. 8 through 12 can produce the above effect in addition to the same effect as the previous embodiment of FIGS. 1 through 7.

What is claimed is:

1. A window regulator for raising and lowering a window pane of an automotive vehicle door, comprising:
   a pair of stationary guide rails each of which is U-shaped in cross section and has first and second parallel side walls, said first side wall being formed with a longitudinal groove of a V-shaped cross section and said second side wall being planar;
   a pair of roller units movably engaged with said guide rails and movable with the window pane, each of said roller units including a first roller in rolling contact with said first side wall and a second roller in rolling contact with said second side wall; and
   a drive unit for driving one of said roller units.

2. A window regulator as set forth in claim 1, in which said second roller is movable toward and away from said second side wall, each of said roller units comprising spring means for urging said second roller against said second side wall.

3. A window regulator as set forth in claim 2, in which each of said roller units comprises another first roller in rolling contact with said first side wall, said second roller being located between said first rollers.

4. A window regulator as set forth in claim 3, in which each of said first rollers has a convex outer circumferential periphery and engaged in said groove, said second roller having a flat outer circumferential periphery.

5. A window regulator as set forth in claim 4, in which each of said roller units comprises a carrier plate assembly and a shaft rotatably supported at the opposite ends thereof on said carrier plate assembly, said shaft having an eccentric portion at a location intermediate between the ends thereof and rotatably mounting at said eccentric portion said second roller.

6. A window regulator as set forth in claim 5, in which each of said roller units further comprises a pivotal lever mounted at one end thereof on said eccentric portion of said shaft to rotate together therewith and operatively connected at the other end thereof to said spring means.

7. A window regulator as set forth in claim 6, in which said carrier plate assembly comprises a pair of elongated support brackets parallel to corresponding one of said guide rails, one of said support brackets being L-shaped in cross section and the other support bracket being planar, said support brackets being integrally connected to each other by a pair of shafts extending therebetween.

8. A window regulator as set forth in claim 7, in which one of said first rollers is rotatably mounted on one of said second-mentioned shafts, said spring means comprising a coil spring placed around the other of said second-mentioned shafts and having an end attached to said other end of said pivotal lever and the other end engaged with one of said support brackets, said coil spring being preloaded so as to urge said pivotal lever in a predetermined direction.

9. A window regulator as set forth in claim 8, in which said first-mentioned shaft extends between said support brackets and rotatably mounted at the opposite ends thereof on same.

10. A window regulator as set forth in claim 9, in which said second mentioned shaft mounting thereon said first roller is located adjacent one ends of said support brackets, the other of said first rollers being rotatably mounted on a shaft extending between said support brackets and located adjacent the other ends of same.

11. A window regulator as set forth in claim 1, in which said first roller is made of a synthetic resinous material and said second roller is made of metal.

12. A window regulator as set forth in claim 9, in which said second roller is a ball bearing roller.

* * * * *